United States Patent [19]

Shorthouse

[11] 4,172,686

[45] Oct. 30, 1979

[54] DEPALLETIZER

[75] Inventor: Joseph Shorthouse, Lethbridge, Canada

[73] Assignee: The Molson Companies Limited, Toronto, Canada

[21] Appl. No.: 830,616

[22] Filed: Sep. 6, 1977

[30] Foreign Application Priority Data

Apr. 22, 1977 [CA] Canada .................................. 276797

[51] Int. Cl.² .......................................... B65G 59/02
[52] U.S. Cl. .................................... 414/114; 198/485; 198/719; 198/748; 414/119
[58] Field of Search ............. 214/8.5 A, 8.5 F, 8.5 G; 198/718, 719, 747, 748, 485

[56] References Cited

U.S. PATENT DOCUMENTS

| 2,873,845 | 2/1959 | Kross ................................ 198/747 X |
| 2,944,702 | 7/1960 | Fenton .......................... 214/8.5 G X |
| 2,993,609 | 7/1961 | Enterline et al. ............ 214/8.5 A X |
| 3,113,683 | 12/1963 | Von Gal ........................... 214/8.5 A |
| 3,263,829 | 8/1966 | Verrinder et al. ............... 214/8.5 A |
| 3,782,562 | 1/1974 | Burt et al. ..................... 214/8.5 F X |
| 3,869,049 | 3/1975 | Selusnik et al. ............. 214/8.5 F X |
| 3,994,389 | 11/1976 | Blair ..................................... 198/719 |

Primary Examiner—L. J. Paperner
Attorney, Agent, or Firm—Anthony J. Casella

[57] ABSTRACT

This invention relates to a de-palletizing machine having a magazine and an elevator for receiving pallets loaded with layers of cartons containing articles which do not extend beyond the confines thereof, the elevator being capable of being raised one layer at a time whereby a pusher carriage will eject the uppermost layer of cartons from the magazine.

7 Claims, 6 Drawing Figures

DEPALLETIZER

This invention relates to a de-palletizing machine. The invention is particularly suitable for handling pallets loaded with cartons and is eminently suitable for use in breweries. In the latter case, empty beer bottles (which do not extend beyond the confines of the carton) are returned to the breweries from retail outlets and these bottles must then be uncased before being transferred to the sterilizer. The uncasing of such bottles is usually done through the intermediary of the cartons being moved to a machine which saws off the bottom flaps of the cartons. The bottles then pass to the sterilizer while the cartons go off to be re-pulped.

At present, box-cars deliver full pallets to the breweries where fork-lift trucks then pass the pallets to locations adjacent a conveyor line where the cartons are removed from the pallet by hand and placed on said conveyor. Not only is this time consuming (4-6 men being employed for this purpose), but is is so monotonous for the employees that the latter have to be changed frequently.

It is the object of the present invention to provide a machine capable of receiving loaded pallets and which will automatically dispense the cartons, one layer at a time, on to the conveyor line and which will, therefore, reduce the total manpower to one machine operator.

The invention is illustrated, by way of example, in the accompanying drawings in which.

Figure 1:
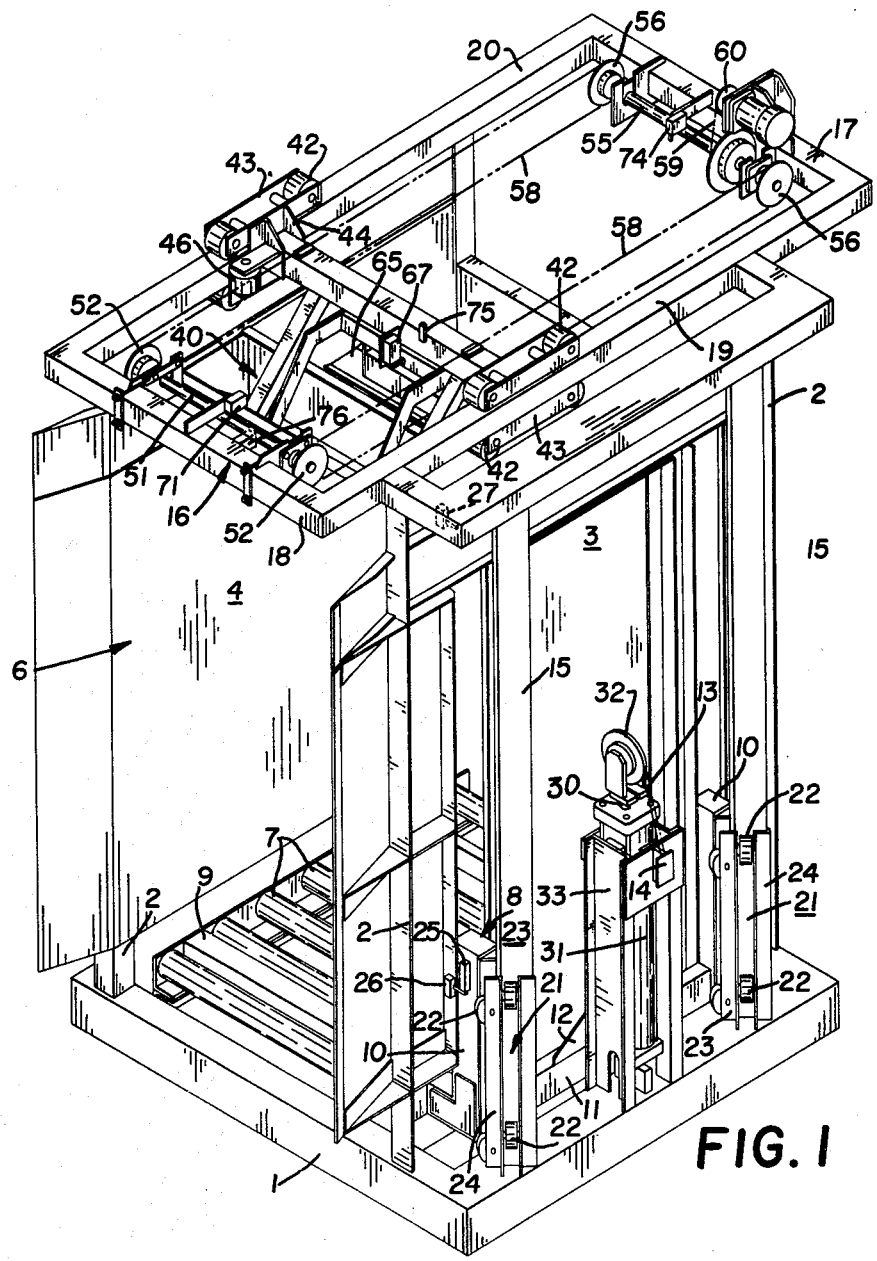
FIG. 1 is a frontal isometric view of the machine of the subject invention.

The machine includes base members 1, vertical frame members 2, a pair of side walls 3,4, and a front wall 5 (FIG. 2) defining a pallet magazine indicated generally at 6. The lower part of the magazine 6 includes a plurality of transversely aligned rollers 7. The magazine 6 also includes an L-shaped pallet elevator indicated generally at 8 (FIGS. 1 and 3) the horizontal members 9 of which are spaced apart and arranged parallel with the rollers 7 and the vertical members 10 of which are also spaced apart and which flank the right-hand side wall 3 of the magazine 6. The vertical members 10 of the elevator 8 are connected together, adjacent the outer face of the right-hand side wall 3 of the magazine 6, by a cross-bar 11 provided with a first lug 12 to which one end of a chain 13 is attached.

A pair of vertical box-girders 15 (hereinafter termed "vertical guide columns") is provided adjacent the outer face of the right side wall 3 of the magazine. The guide columns 15, as do the vertical frame members 2, extend between the base members 1 and an upper horizontal rectangular frame indicated generally at 16 the latter comprising forward and rear cross-members 17,18 and right and left side frame members 19,20.

Each vertical guide column 15 serves as the mounting for an associated vertical roller carriage indicated generally at 21 consisting of upper and lower rollers 22 mounted between side plates 23,24. The side plates 24 are secured to the vertical members 10 of the pallet elevator 6, the rearward one of said members being provided with a stop 25 which, when the elevator 10 is in its lowermost position, is adapted to contact a lower side micro-switch 26 (FIG. 1) located on the outer face of the right-hand side wall 3 and which, when the elevator 10 is in its uppermost position, contacts an upper side micro-switch 27 (FIG. 1) located on the right-hand vertical frame member 2 adjacent the underside of the right-hand side frame member 19.

Located adjacent the outer face of the right-hand side wall 3 of the pallet magazine 6 and substantially midway between the pair of vertical guide columns 15 is a vertically mounted hydraulic ram 30 operating within a cylinder 31 (FIG. 1) connected to a suitable supply of regulated and controlled pneumatic pressure, the upper end of said ram 30 serving as the mounting for a sprocket wheel 32 over which the chain 13 passes, the end of the latter (remote from the lug 12 on the pallet elevator cross-bar 11) being attached to a second lug 14 fast on the upper part of the mounting 33 for the cylinder 31.

The upper horizontal frame 16 serves as the mounting for a carton sensing pusher carriage indicated generally at 40. The carriage includes a spaced pair of side roller carriages, indicated generally at 41, each comprising pairs of upper and lower rollers 42 carried by side plates 43 and which rollers are adapted, respectively, to engage the upper and lower surfaces of the right and left side frame members 19,20. Each roller carriage 40 has a pair of lugs 44 between which a cross-bar 45 is secured, the latter extending between one carriage 40 to the other, parallel to and between, the forward and rear cross-members 17,18 of the upper horizontal frame 16. Each carriage 41 also includes a fifth roller 46 adapted to engage the inner face of its associated frame member 19,20.

Depending from the underside of the cross-bar 45, adjacent each end thereof is a lug (not shown).

A first shaft 51 is rotatably mounted on the rear cross-member 18 of the upper frame 16, which shaft carries a pair of sprocket wheels 52.

A second shaft 55 is rotatably mounted on the forward cross-member 17 of the upper frame 16 the ends of which shaft carry a pair of sprocket wheels 56 with an intermediate sprocket wheel 57 therebetween. Chain drives 58 extend over each pair of wheels 52,56 and each lug engages an associated chain drive 58.

A chain drive 59 extends over the intermediate sprocket wheel 57 to a reduction gear 60 located above wheel 57 and carried by the forward cross-member 17, said gear 60 being driven by means of a hydraulic motor 61 (FIG. 2) located just beyond the front wall 5 of the pallet magazine 6.

Figure 5:
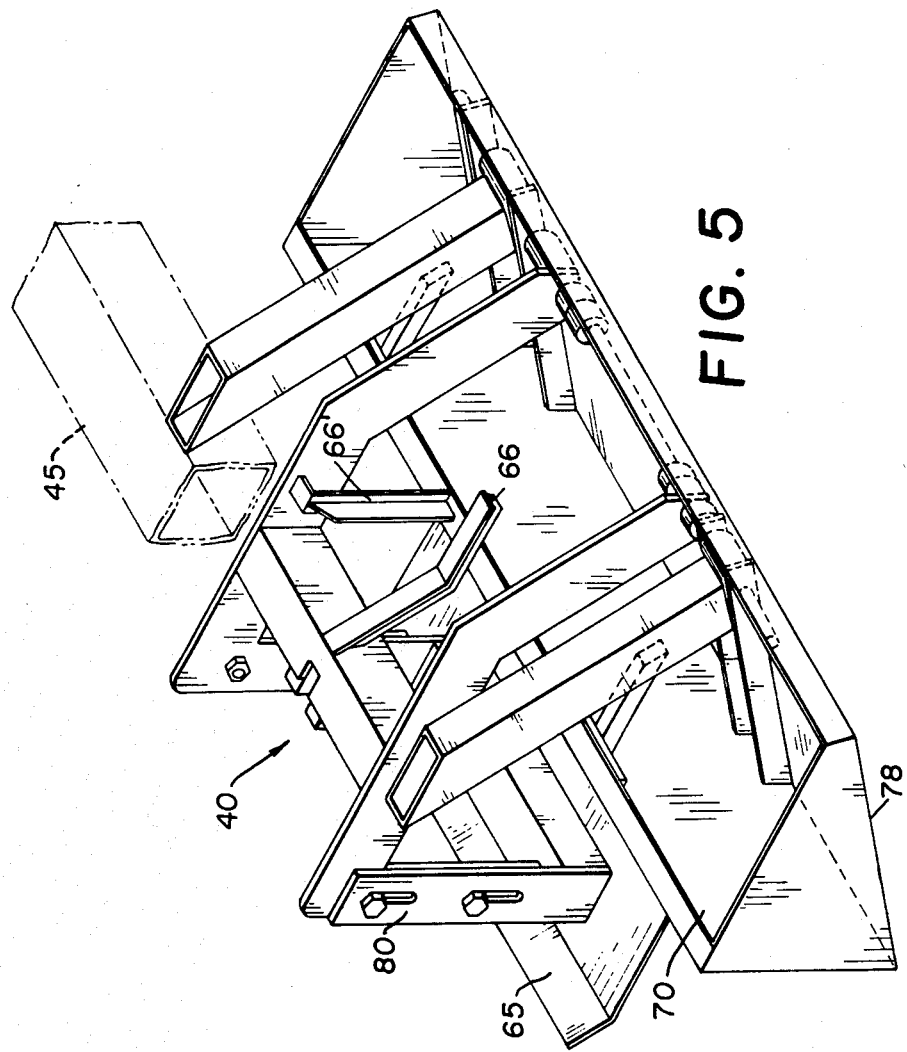
FIG. 5 is a detailed perspective view of the pusher plate forming a portion of the machine of the subject invention.

The cross-bar 45 serves as the mounting for a vertically movable carton sensing plate 65 (shown in more detail in FIG. 5 and 6) depending therefrom and provided with a horizontally extending tail 66.

The cross-bar 45 also serves as the mounting for a carton pusher plate 70 pivoted thereto and provided with a vertically extending finger 66' normally contacting a first micro-switch 67 (FIGS. 1 and 2) also carried by the cross-bar 45.

OPERATION

In operation, a pallet of normal construction and loaded with superposed layers of articles e.g. empty beer cartons nine deep, is brought from a road vehicle or rail car by a fork truck and placed on a roller conveyor leading to the de-palletizing machine. Such a pallet is then fed into the pallet magazine, if desired by automatic in-feed aparatus or by fork truck and on to the plurality of transverse rollers 7 and horizontal members 9 of the pallet elevator 8.

The operator of the de-palletizing machine then starts the latter by depressing a control button. This actuates a solenoid 77 (FIG. 2) causing the hydraulic ram 30 to move upwardly from its cylinder 31 thus raising the sprocket wheel 32, via chain 13, to move the loaded elevator 8 upwardly, through the intermediary of the vertical roller carriages 21 moving up the vertical guide columns 15. Such movement continues until the tops of the uppermost layer of cartons engage the sensing plate 65 which is thereby raised upwardly until its horizontal tail 66 contacts and closes a micro-switch 71 (FIG. 1) mounted on the rear cross-member 18 which terminates further upward movement of the elevator 8 and closes a first solenoid valve 72 (FIG. 2) which energizes the hydraulic motor 61 thus driving shaft 55 through the intermediary of reduction gear 60, chain drive 59 and intermediate sprocket wheel 57. This then drives the chain drives 58 and the side roller carriages 41 thus causing the pusher plate 70 and carriage 40 to move forwardly thereby urging the top row of cartons on to an angulated ball-bearing or roller-bearing conveying table (not shown) located forward of the de-palletizing machine from where they are channelled into sorting and sizing patterns before being transferred to other apparatus e.g. bottom cut-off machines (also not shown).

When the pusher carriage 40 reaches the extent of its forward movement i.e. when all of the uppermost layer of cartons have been ejected from the de-palletizer, the cross-bar 45 will strike a forward micro-switch 74 (FIG. 1) carried by the forward cross-member 17 and this reverses the action of the pusher carriage 40 whereupon the latter will return towards the rear of the machine until a stop 75 on the cross-bar 45 strikes a second micro-switch 76 closure of which then cuts off further movements of the pusher carriage 40.

Upon closure of a micro-switch 76, solenoid 77 will open thus causing ram 30 to move the elevator 8 upwardly one further carton depth until the horizontal tail 66 of the sensing plate 65 again closes micro-switch 71 and the pusher carriage 40 completes yet another cycle, again pushing the uppermost row of cartons from the de-palletizer.

The operation cycle is repeated until all rows or layers of cartons have been ejected from the magazine and the pallet is empty. The elevator 8 will have thus reached its uppermost position. When this occurs, the vertical roller carriages 21 will also have reached the extent of their upward travel on the vertical guide columns. The extent of upward travel is determined by means of the stop 25 striking the upper side micro-switch 27. When this occurs, solenoid 77 will close and the cylinder 31 will cause the ram 30, and hence the elevator 8, to move downwardly until the stop 25 strikes (and closes) the lower side micro-switch 26 which thus terminates all further action of the machine until the empty pallet is removed from the magazine 6 and a full one introduced.

The empty pallet is ejected forwardly from the magazine by the next loaded pallet entering the magazine. If desired, the empty pallets can be ejected from the magazine into an automatic pallet stacker.

Figure 2:
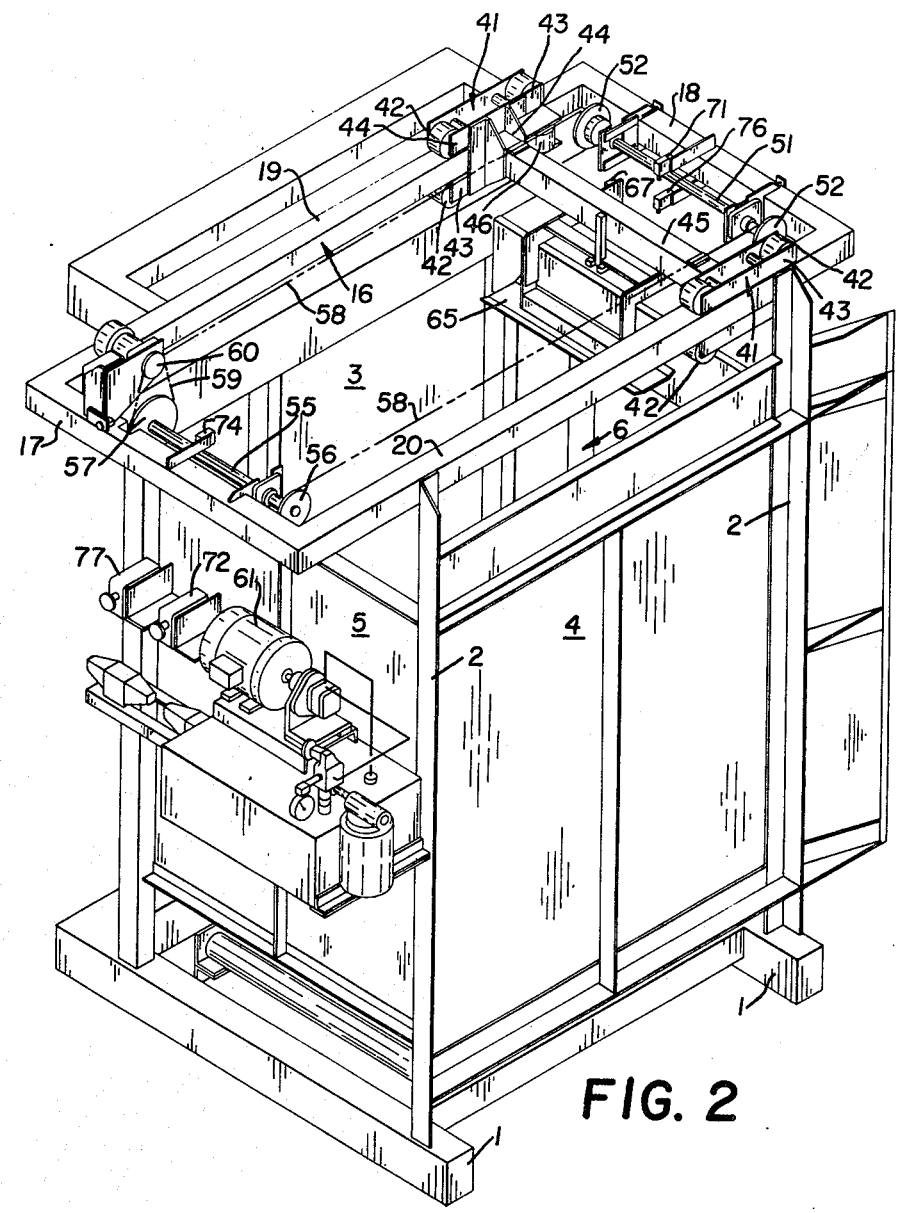
FIG. 2 is a rear isometric view of the machine of the subject invention.
Figure 3:
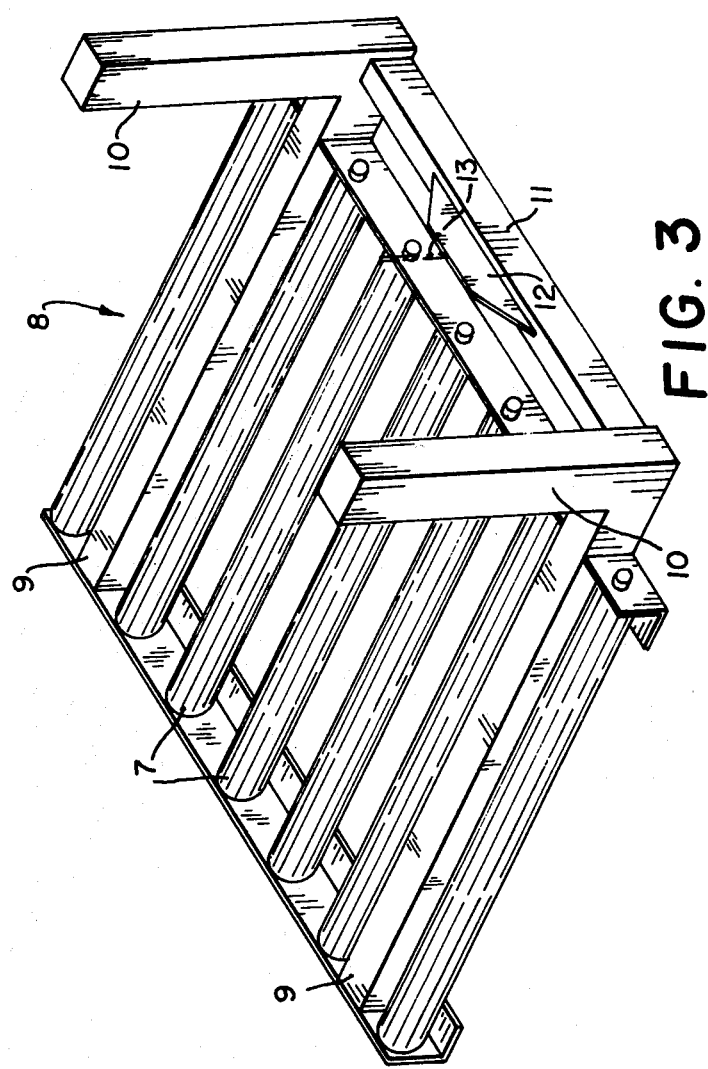
FIG. 3 is a detailed perspective view of the L-shaped pallet elevator forming a portion of the subject machine.
Figure 4:
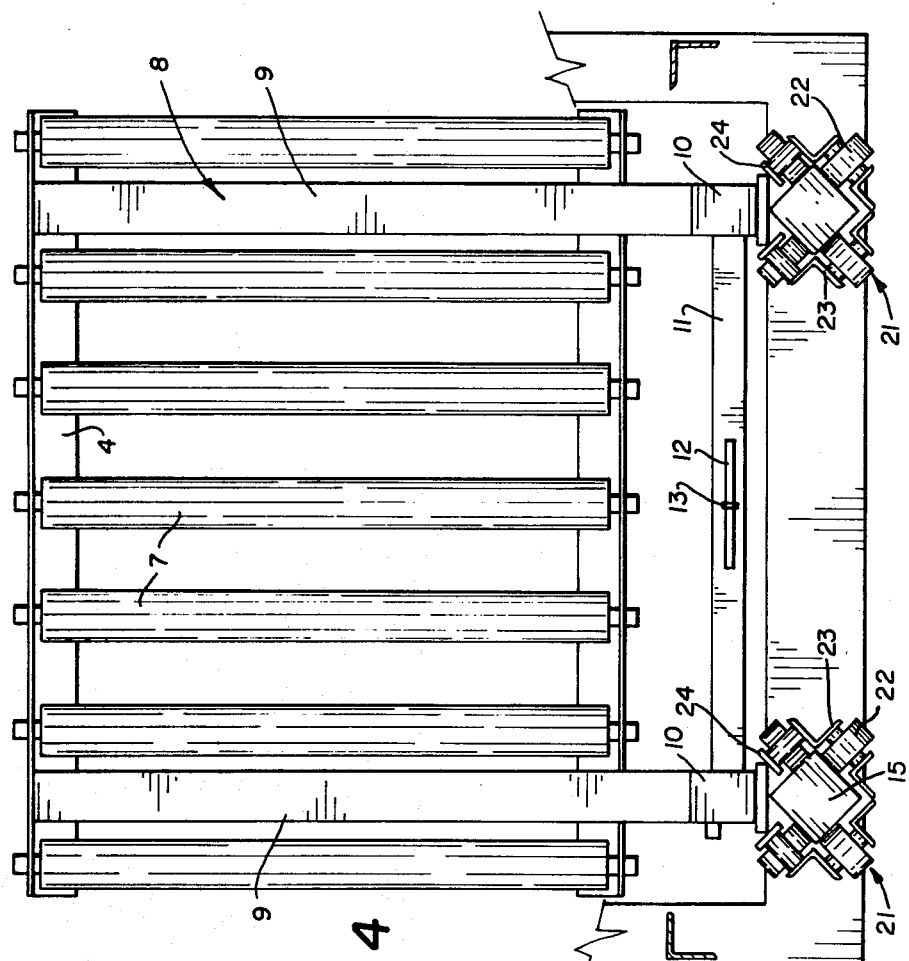
FIG. 4 is a partial plan view of the L-shaped pallet elevator of the subject invention.
Figure 6:
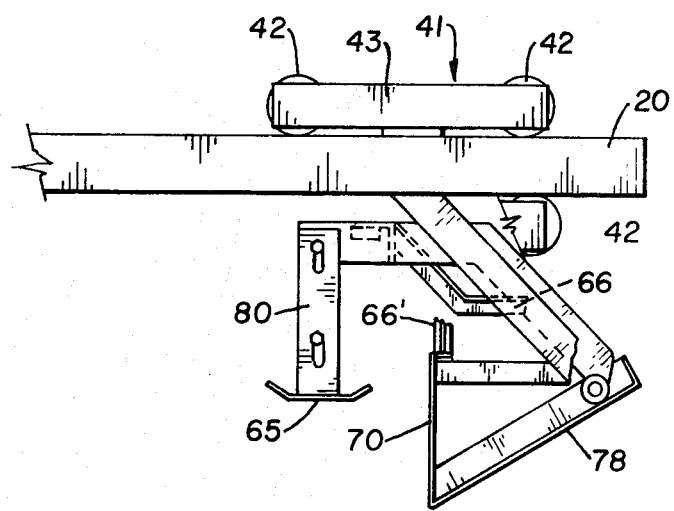
FIG. 6 is a detailed front elevational view of the pusher plate assembly forming a portion of the subject invention.

If, by any chance, all is not well with an upper layer of cartons, i.e. a carton is partially "cocked" on its side (or is non-aligned with respect to the remainder) and thus projects above the normal planar surface presented by the tops of the remainder of the cartons, the pusher plate 70 will pivot. Such pivotal movement will be permitted because the under surface of the said plate is angulated (as at 78 FIGS. 5 and 6). Upon such pivoting, the vertical finger 66' will move out of contact with micro-switch 67 which thereby closes and this will terminate all further action of the machine. Hence, micro-switch 67 acts as a safety switch. Stated differently, as shown in FIGS. 1, 2, and 6, the carriage 40 is mounted for reciprocal movement along the upper edge of the frame, and more particularly along generally horizontally extending frame members 19 and 20 which are disposed parallel to the upper planes of the cartons to be ejected from the magazine. During an ejection operation, the carriage 40 is moved in a direction such that the carton-engaging forward portion 70 of the pusher plate contacts and ejects the uppermost layer of cartons out of the magazine, after which the carriage reciprocally returns to its initial position. In the event that a carton of the next lower level is partially "cocked" on its sides such that it projects above the normal planar surface of the next layer of cartons, the angulated rear portion 78 of the pusher plate will contact the projecting portion of the "cocked" carton thereby resulting in rotation of the pusher plate 70 and disengagement of the vertical finger 66' with the micro-switch 67 thereby terminating all further action of the de-palletizing machine.

The sensing plate is vertically adjustable through adjustable side links 80 (FIG. 5) so as to accommodate depths of cartons of any measurement depending upon the amount of relative adjustability between said links.

I claim:

1. A compact, unitary de-palletizing machine comprising:
   (a) a frame;
   (b) side and end walls on the frame providing a magazine for receiving a pallet therein loaded with a plurality of superposed layers of cartons containing articles which do not extend beyond the confines thereof;
   (c) an elevator integrally mounted within the magazine for raising and lowering said pallet;
   (d) means for raising and lowering said elevator;
   (e) sensing means positioned for contact by the uppermost layer of said articles when the elevator reaches a predetermined height for de-energizing said raising and lowering means;
   (f) a pusher carriage mounted adjacent the upper portion of said frame for generally horizontal reciprocation in a plane parallel to the planes of the layers of cartons, said pusher carriage including a pusher plate having a generally vertical, carton-engaging forward portion, and an angulated rear portion;
   (g) safety switch means operatively associated with said pusher plate such that when said carriage is activated by said sensing means upon said de-energizing of the raising and lowering means, the carton-engaging forward portion of the pusher plate, when the cartons are in alignment, contacts and ejects the uppermost layer of cartons out of said magazine and then reciprocally returns to its initial position, whereas when at least one carton in said next lower layer of cartons is non-aligned and projects above the plane of said next lower layer of cartons, said angulated rear portion contacts said projecting carton and thereby actuates the safety switch means to stop the entire carton ejection operation;

(h) said pusher carriage upon its return to said initial position enabling said raising and lowering means to be re-energized for a further cycle of the elevator and pusher carriage until all layers of the cartons have been fully ejected; and (i) means on the elevator, activated when the latter has reached its supermost position and the pallet emptied, causing the elevator to descend to a lowermost position within the magazine where the empty pallet can be removed and replaced by a full pallet prior to a further full cycle of the machine being initiated.

2. A machine according to claim 1 wherein said elevator raising and lowering means includes a roller carriage connected to the elevator, said carriage being vertically movable on said frame and operated by a hydraulic ram; a first stop on the frame contacted by the carriage and limiting the extent of upward travel of the carriage by actuating the ram to move said carriage downwardly; and a second stop on the frame adapted to be contacted by the carriage in its lowermost position and thereby terminate all further actuation of the machine.

3. A machine according to claim 2 including a first micro-switch and wherein the sensing means includes a pivotable sensing plate which, when contacted by the uppermost layer of the articles, rocks about its pivot and closes said micro-switch thereby terminating further upward movement of the roller-carriage and elevator.

4. A machine according to claim 3 wherein said pusher carriage includes an angulated, pivotable, pusher plate, said carriage normally being horizontally movable on said frame from an initial one end of the magazine to the other end thereof.

5. A machine according to claim 4 including a first solenoid closed by said first micro-switch to activate said pusher carriage, and a forward micro-switch carried by the frame and contacted by the pusher carriage when it reaches said other end of the magazine to reverse the movement of said pusher carriage to said initial one end.

6. A machine according to claim 5 including a stop on said pusher carriage and a second micro-switch on said frame which, when contacted by said stop, terminates movement of said pusher carriage.

7. A machine according to claim 6 including a second solenoid opened upon closure of said second micro-switch to re-energize said roller carriage to raise the elevator the depth of the next succeeding layer of articles.

* * * * *